United States Patent
Max et al.

(10) Patent No.: US 10,234,866 B2
(45) Date of Patent: Mar. 19, 2019

(54) DEVICE AND METHOD FOR THE AUTOMATED DRIVING OF A MOTOR VEHICLE

(71) Applicants: VOLKSWAGEN AG, Wolfsburg (DE); HELLA GMBH & CO. KGAA, Lippstadt (DE)

(72) Inventors: Stephan Max, Gifhorn (DE); Klaas Hauke Baumgärtel, Ganderkesee (DE); Stefan Brosig, Hankensbüttel (DE); Torsten Büschenfeld, Uetze (DE); Thomas Niemann, Delmenhorst (DE)

(73) Assignees: Volkswagen AG (DE); Hella GMBH & Co. KGAA (DE)

( * ) Notice: Subject to any disclaimer, the term of this patent is extended or adjusted under 35 U.S.C. 154(b) by 0 days.

(21) Appl. No.: 15/758,107

(22) PCT Filed: Sep. 13, 2016

(86) PCT No.: PCT/EP2016/071594
§ 371 (c)(1),
(2) Date: Mar. 7, 2018

(87) PCT Pub. No.: WO2017/046104
PCT Pub. Date: Mar. 23, 2017

(65) Prior Publication Data
US 2018/0246522 A1    Aug. 30, 2018

(30) Foreign Application Priority Data

Sep. 14, 2015 (DE) .......................... 10 2015 217 486

(51) Int. Cl.
*G05D 1/02* (2006.01)
*G01C 21/30* (2006.01)
(Continued)

(52) U.S. Cl.
CPC ......... *G05D 1/0255* (2013.01); *B60R 19/483* (2013.01); *B60W 30/06* (2013.01);
(Continued)

(58) Field of Classification Search
CPC .... G05D 1/0255; B60R 19/483; G01C 21/30; G01S 15/025; G01S 15/87; G01S 15/931;
(Continued)

(56) References Cited

U.S. PATENT DOCUMENTS 8,364,390 B2 * 1/2013 Harada ............ G08G 1/096725
340/435
2008/0303696 A1 * 12/2008 Aso ....................... G08G 1/161
340/935
(Continued)

FOREIGN PATENT DOCUMENTS

DE      202005008450 U1    9/2005
DE      102012008858 A1    11/2012
(Continued)

OTHER PUBLICATIONS

Search Report for International Patent Application No. PCT/EP2016/071594, dated Nov. 11, 2016.

*Primary Examiner* — Sisay Yacob
(74) *Attorney, Agent, or Firm* — Barnes & Thornburg LLP

(57) ABSTRACT

A device for autonomously driving a transportation vehicle having at least one sensor system for sensing a surrounding area of the vehicle, at least one controller for controlling at least one actuator system of the vehicle, and a memory for storing a map of the surroundings, wherein the at least one controller evaluates surroundings data collected by the at least one sensor system, determines the location of the vehicle by the evaluated surroundings data in the map of the surroundings, and controls the at least one actuator system (Continued)

of the vehicle so that a predefined trajectory is travelled autonomously, wherein the controller has an obstacle-detection device to detect obstacles in the surroundings of the vehicle, wherein the at least one sensor system has at least one acceleration sensor, and the obstacle-detection device uses measurement data collected by the at least one acceleration sensor to detect collisions with obstacles.

8 Claims, 2 Drawing Sheets

(51) Int. Cl.
| | |
|---|---|
| G01S 15/02 | (2006.01) |
| G01S 15/87 | (2006.01) |
| G01S 15/93 | (2006.01) |
| B60R 19/48 | (2006.01) |
| B62D 15/02 | (2006.01) |
| B60W 30/06 | (2006.01) |

(52) U.S. Cl.
CPC ......... *B62D 15/0285* (2013.01); *G01C 21/30* (2013.01); *G01S 15/025* (2013.01); *G01S 15/87* (2013.01); *G01S 15/931* (2013.01); *B60W 2420/54* (2013.01); *B60W 2420/905* (2013.01); *B60W 2422/90* (2013.01); *B60W 2550/10* (2013.01); *G01S 2015/938* (2013.01)

(58) Field of Classification Search
CPC ............... G01S 2015/938; B60W 2420/54; B60W 2420/905; B60W 2422/90; B60W 2550/10
See application file for complete search history.

(56) References Cited

U.S. PATENT DOCUMENTS

| | | | | |
|---|---|---|---|---|
| 2010/0049375 | A1* | 2/2010 | Tanimoto | B60T 7/12 701/1 |
| 2010/0228427 | A1* | 9/2010 | Anderson | B60W 30/09 701/31.4 |
| 2015/0246678 | A1* | 9/2015 | Hauler | B62D 1/28 701/25 |
| 2016/0339959 | A1* | 11/2016 | Lee | B62D 15/0265 |

FOREIGN PATENT DOCUMENTS

| | | |
|---|---|---|
| DE | 102013114655 A1 | 7/2014 |
| DE | 102013201799 A1 | 8/2014 |
| DE | 102013213226 A1 | 1/2015 |
| EP | 1688328 A1 | 8/2006 |
| EP | 2412222 A2 | 2/2012 |
| EP | 2816372 A2 | 12/2014 |
| EP | 2821811 A1 | 1/2015 |
| EP | 2897014 A1 | 7/2015 |
| ES | 2436845 A2 | 1/2014 |
| WO | 2013159845 A1 | 10/2013 |

\* cited by examiner

DEVICE AND METHOD FOR THE AUTOMATED DRIVING OF A MOTOR VEHICLE

PRIORITY CLAIM

This patent application is a U.S. National Phase of International Patent Application No. PCT/EP2016/071594, filed 13 Sep. 2016, which claims priority to German Patent Application No. 10 2015 217 486.7, filed 14 Sep. 2015, the disclosures of which are incorporated herein by reference in their entireties.

SUMMARY

Illustrative embodiments relate to a device and to a method for the automated driving of a transportation vehicle.

BRIEF DESCRIPTION OF THE DRAWINGS

The disclosed embodiments will be explained in more detail below with reference to the drawings, in which.

DETAILED DESCRIPTION

Figure 1:
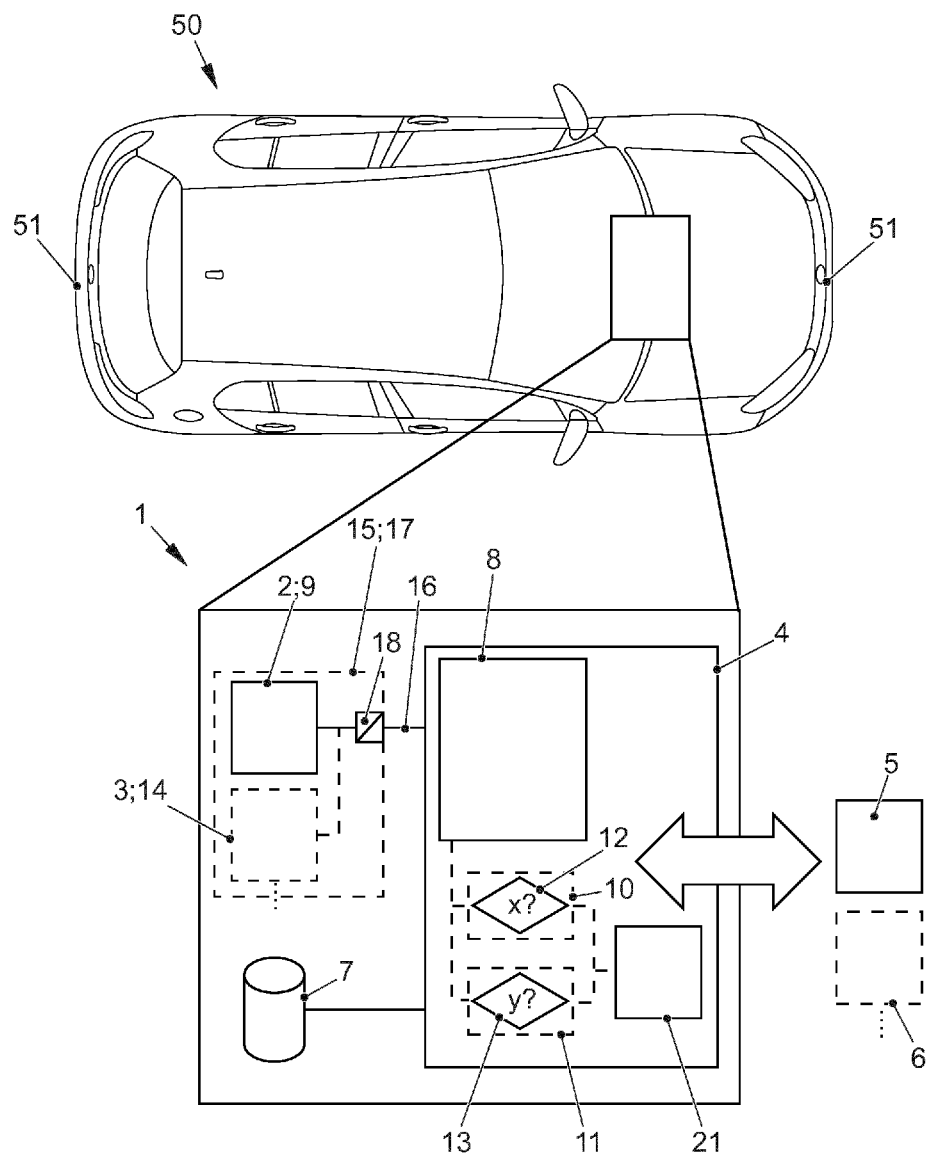
FIG. 1 shows a schematic illustration of an embodiment of the device for the automated driving of a transportation vehicle.

Modern transportation vehicles have a multiplicity of assistance systems which assist the driver in driving the transportation vehicle. Semi-autonomous and autonomous systems are being increasingly used in this context, the systems permitting semi-automatic or fully automatic control of the transportation vehicle without the driver having to be seated in the transportation vehicle.

It is known to allow transportation vehicles to drive in an automated state on trajectories using an assistance system. For example, in the way the transportation vehicle can be steered in an automated state into parking spaces in garages or in car parks. For this purpose, the surroundings of the transportation vehicle are generally sensed by a sensor system and the location of the transportation vehicle in a stored map of the surroundings is determined using the surroundings data generated by the sensor system. A stored or calculated trajectory is then retrieved and the transportation vehicle is steered into the parking space on the trajectory in an automated state by the assistance system.

To ensure the safety of a driver, a front seat passenger and of persons and objects in the vicinity at all times and also to protect the transportation vehicle itself, safety precautions are necessary which stop the automated travel of the transportation vehicle if there is the risk of a collision with persons or objects.

WO 2013/159845 A1 discloses a method for carrying out an autonomous parking process of a transportation vehicle, wherein between an operator who is located outside the transportation vehicle and the transportation vehicle there is a communication link which permits at least a command for activating the autonomous parking process of the transportation vehicle to be transmitted. A wireless communication apparatus is provided for this purpose.

In addition to a direct abort of the automated travel by the driver other persons, for example, by the automated travel being aborted by a remote control system or by a door or tailgate of the transportation vehicle being opened, the sensor system of the transportation vehicle is above all used to detect obstacles and determine collisions with these objects.

The sensor systems which are used, such as, for example, camera systems, laser scanners (e.g., light detection and ranging, LIDAR) or radar sensors, are operated individually or else in combination with one another here. However, the drawback of these systems is that they are very costly. Therefore, they are limited to use in the luxury class and are unsuitable for the volume class of transportation vehicles.

The disclosed embodiments, therefore, provide a device and a method for the automated driving of a transportation vehicle, in which collision detection can be carried out in a cost-effective way.

In the text which follows, an acceleration sensor generally denotes a sensor system which as an inertial sensor measures the acceleration in at least one spatial dimension, converts the measured acceleration into an electrical signal and makes available this electrical signal for further processing, for example, at an interface.

The device for the automated driving of a transportation vehicle comprises at least one sensor system for sensing a surrounding area of the transportation vehicle, at least one controller for controlling at least one actuator system of the transportation vehicle, and a memory for storing a map of the surroundings, wherein the at least one controller is constructed to evaluate surroundings data collected by the at least one sensor system, to determine the location of the transportation vehicle by the evaluated surroundings data in the map of the surroundings, and to control the at least one actuator system of the transportation vehicle in such a way that a predefined trajectory is travelled in an automated travel mode, wherein the controller comprises an obstacle detection apparatus which is constructed to detect obstacles in the surroundings of the transportation vehicle, wherein the at least one sensor system has at least one acceleration sensor, and the obstacle detection apparatus uses the measurement data acquired by the at least one acceleration sensor to detect collisions with obstacles.

In addition, a method for the automated driving of a transportation vehicle is made available comprising the following operations: sensing a surrounding area of the transportation vehicle by at least one sensor system, determining the location of the transportation vehicle in a map of the surroundings by evaluating surroundings data generated on the basis of the sensed surroundings, automated driving along a predefined trajectory by controlling at least one actuator system of the transportation vehicle, wherein obstacles in the surroundings of the transportation vehicle are detected by an obstacle detection apparatus, wherein collisions with obstacles are sensed by the obstacle detection apparatus using at least one acceleration sensor.

The disclosed embodiments are based on the concept of easily detecting collisions of a transportation vehicle with objects in the surroundings of the transportation vehicle by using cost-effective acceleration sensors. At least one acceleration sensor, optionally a plurality thereof, is/are arranged or installed on or in the transportation vehicle. If an acceleration is measured, for example, as a pulse-like surge, by one of the acceleration sensors during an automated travel mode, a collision of the transportation vehicle with an obstacle is inferred therefrom. The automatic travel mode is then aborted and the transportation vehicle is braked by the actuator system and brought to a stop. The benefit of the disclosure lies in the simple and cost-effective possibility of making available a safety precaution for avoiding collisions.

In at least one disclosed embodiment there is provision that the at least one acceleration sensor is arranged or installed on or in a bumper of the transportation vehicle. The at least one acceleration sensor is arranged or installed at the location where there is the greatest probability of collisions occurring during an automated travel mode. The sensing of collisions is then especially effective, and an abort of an automated travel mode and the braking of the transportation vehicle can then be carried out with a short delay.

In a further disclosed embodiment there is provision that the device comprises at least one further sensor system, and the at least one further sensor system has at least one ultrasonic sensor, wherein in each case one of the at least one acceleration sensors and in each case one of the at least one ultrasonic sensors are combined to form a unit, with the result that at least one associated component is used jointly. Costs of materials and manufacture and then later costs for maintenance and repair can be reduced through the joint use of an associated component, for example, the communication infrastructure or mechanical components of the transportation vehicle. Furthermore, redundant sensing of the surroundings of the transportation vehicle is made available by using two different sensor types.

In at least one disclosed embodiment there is provision that the at least one jointly used component is a mount. For example, the ultrasonic sensor and the acceleration sensor can be installed in a joint housing which is installed in the transportation vehicle using a single mount, for example, in the bumpers.

In a further disclosed embodiment, the at least one jointly used component is a control line. If, as in the example given above, the ultrasonic sensor and the acceleration sensor are installed in a joint housing, a single run of cabling, by the one control line, is then sufficient still to be able to interrogate and control both sensors. Therefore, both sensors can be connected, for example, in a cost-effective way to an existing bus system (e.g., controller area network (CAN bus). The joint use of just one control line in turn provides a saving in terms of expenditure and costs.

In a further disclosed embodiment there is provision that the obstacle detection apparatus is embodied in such a way that obstacles are classified by comparing measurement data acquired by the at least one acceleration sensor with measurement data acquired by the at least one ultrasonic sensor. Such a classification by comparison of the measurement data of the two sensor types permits, for example, assessment of the obstacle with which the transportation vehicle collides. Therefore, for example, in the case of a branch which is covered with dense foliage and is located in the travel path of the transportation vehicle the ultrasonic sensor can detect usually only as a solid obstacle. The same branch is hardly perceived at all by the acceleration sensor, since in the event of contact or a collision with the transportation vehicle the branch only gives rise to very low acceleration. Through a comparison, a classification can consequently be made, for example, as a "non-solid" obstacle. An automated travel mode can then either not be aborted at all or the braking of the transportation vehicle can then take place more slowly and gently.

At least one disclosed embodiment provides that the at least one acceleration sensor is embodied as a multi-dimensional acceleration sensor. As a result, accelerations can also be sensed in more than one dimension, as a result of which the resolution when detecting collisions with obstacles is generally improved. It is therefore possible, for example, also to detect collisions with obstacles which do not lie directly on a measured acceleration axis of a merely unidimensional acceleration sensor. The lateral collisions can therefore be detected for the first time or detected better. Furthermore, multi-dimensional acceleration measurement data of other systems and services of the transportation vehicle can therefore also be made available, for example, the multi-dimensional acceleration measurement data can be made available in a beneficial state to a transportation vehicle odometry for location determination and/or for navigation.

In a further disclosed embodiment there is provision that the controller comprises a safety apparatus which is constructed to output a signal if a safety criterion is satisfied by the measurement data acquired by the at least one acceleration sensor. In this way, a signal for detecting accidents and for activating and prestressing safety systems have been made available. The safety criterion can be, for example, a certain magnitude, amplitude or a certain direction of the acceleration. If the safety criterion is satisfied by measurement data acquired by the acceleration sensor, for example, because a corresponding collision has taken place, a signal is output by the safety apparatus. The signal can then serve, for example, to tighten a seat belt of the transportation vehicle or generate or output an emergency signal. The fact that at least one acceleration sensor is also used for such a safety system provides a further cost benefit, since the same component is used for additional services.

In at least one disclosed embodiment there is also provision that the controller comprises a monitoring apparatus which is suitable for outputting a signal in the parked state of the transportation vehicle if a monitoring criterion is satisfied by the measurement data acquired by the at least one acceleration sensor. The monitoring criterion can be, for example, a certain magnitude or amplitude of the measurement data which is acquired by the at least one acceleration sensor and is exceeded in the parked state of the transportation vehicle. In this way, damage to the transportation vehicle, for example, through a collision with another transportation vehicle during a parking process of the other transportation vehicle or through vandalism, can be sensed. If the monitoring criterion is satisfied, the monitoring apparatus generates a corresponding signal which is then used, for example, by a communication system, to inform the keeper of the transportation vehicle, safety services or the police etc. The fact that the at least one acceleration sensor is also used for such monitoring provides a further cost benefit, since the same component is used for additional services.

FIG. 1 shows a schematic view of a disclosed embodiment of a device 1 for the automated driving of a transportation vehicle 50. The device 1 comprises a sensor system 2 and optionally further sensor systems 3 which sense the surroundings of the transportation vehicle 50. In addition, the device 1 comprises a controller 4 which controls at least one actuator system 5 and, according to demand, optionally further actuator systems 6 of the transportation vehicle 50, as well as a memory 7 in which a map of the surroundings and at least one trajectory are stored. The controller 4 comprises an obstacle detection apparatus 8.

The at least one actuator system 5 which is controlled by the controller 4 and further actuator systems 6 of the transportation vehicle 50 are embodied, for example, in such a way that steering systems, switching systems, brake systems and drive systems are controlled in an automated state, with the result that an automated travel mode is made possible.

The sensor system 2 of the transportation vehicle 50 comprises an acceleration sensor 9 which is arranged, for example, on one of the bumpers 51 of the transportation vehicle 50 or is installed in one of the bumpers 51. The further sensor system 3 optionally comprises an ultrasonic sensor 14. The acceleration sensor 9 and the ultrasonic sensor 14 combine to form one unit 15. The unit 15 also comprises here, for example, a joint housing 17 in which the acceleration sensor 9 and the ultrasonic sensor 14 are installed, and a joint interface 18. The combination of the acceleration sensor 9 and the ultrasonic sensor 14 permits clear cost benefits, since the work effort and the material costs for manufacture are reduced. In this way, for example, a control line 16 can be used jointly, with the result that there is a saving in terms of material and expenditure.

If an automated travel mode is concluded, the acceleration sensor 9 and the optional ultrasonic sensor 14 acquire measurement data which is fed to the obstacle detection apparatus 8 via the common control line 16 via the controller 4. The obstacle detection apparatus 8 evaluates the acquired measurement data and determines whether collisions have occurred with obstacles. If a collision has occurred, the obstacle detection apparatus 8 generates a corresponding signal which cause the controller 4 to abort the automated travel mode and control the actuator systems 5, 6 in such a way that the transportation vehicle 50 is braked and brought to a stop.

The controller optionally comprises a safety apparatus 10 and a monitoring apparatus 11 which are connected to the obstacle detection apparatus 8, with the result that they receive a signal if a collision has occurred with an obstacle, and, for example, also have direct access to acquired measurement data of the acceleration sensor 9.

The safety apparatus 10 checks whether a predefined safety criterion 12 is satisfied during an automated travel mode or in principle also in other situations, for example, during non-automated travel modes. The safety criterion 12 can be, for example, a predefined value for an acceleration which is sensed by the acceleration sensor 9. If the safety criterion 12 is satisfied, the safety apparatus 10 generates a signal which can trigger an action of further additional systems 21 of the controller 4. For example, in this way a seat belt in the transportation vehicle 50 can be prestressed or an emergency signal can be automatically output in expectation of a severe accident when strong acceleration occurs.

In contrast, the monitoring apparatus 11 checks, in the parked state of the transportation vehicle 50, whether a specific monitoring criterion 13 is satisfied. If the acceleration sensor 9 senses, for example, an acceleration in the parked state of the transportation vehicle 50 such has occurs in the case of a collision with another parking transportation vehicle or in the case of vandalism to the transportation vehicle 50, the monitoring apparatus 11 outputs a signal to further additional systems 21 of the controller 4. These further additional services 21 then inform, for example, the keeper of the transportation vehicle 50 or alert safety services or the police.

Figure 2:
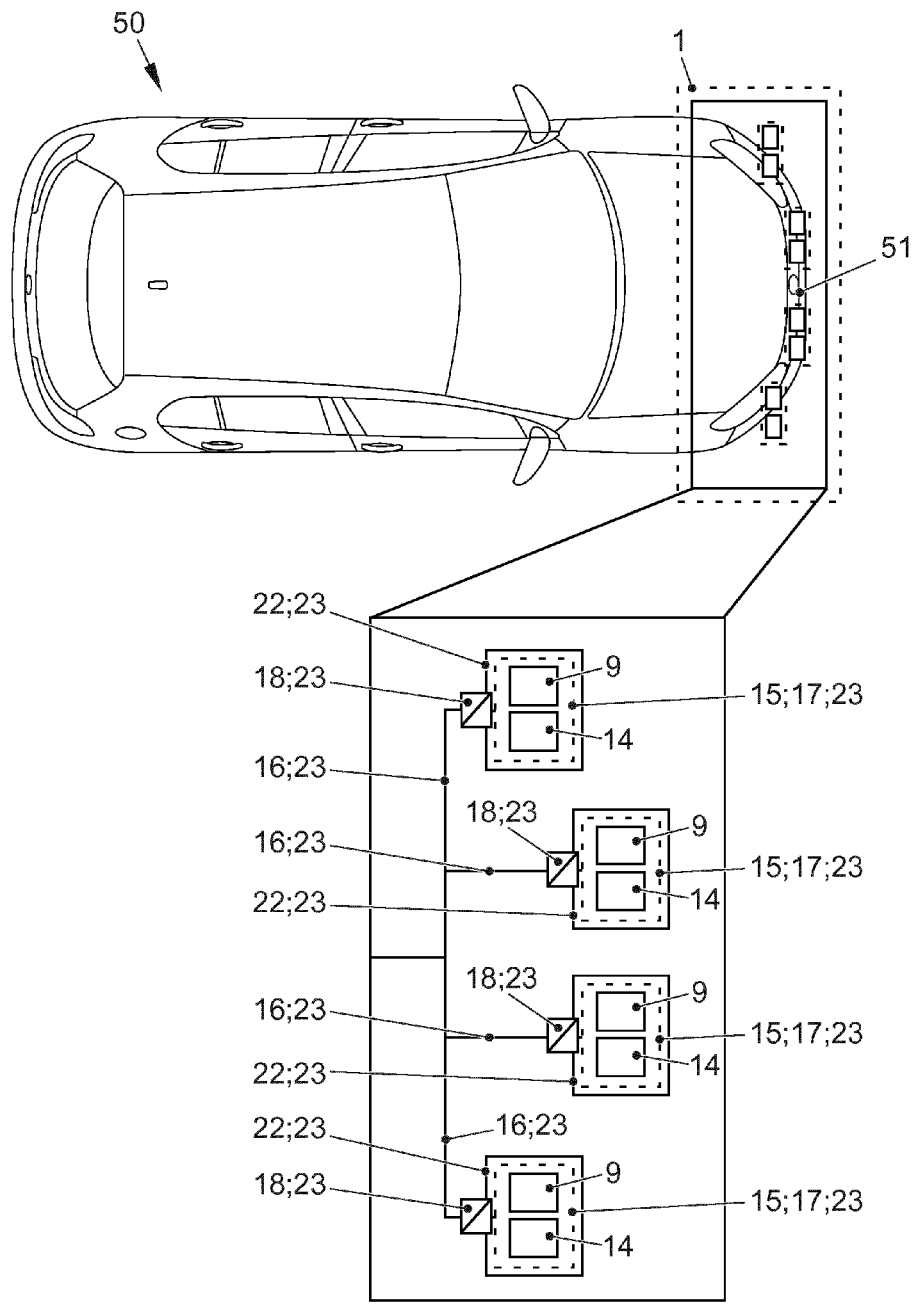
FIG. 2 shows a schematic illustration of the arrangement of the units which are respectively composed of an acceleration sensor and an ultrasonic sensor in the bumper of a transportation vehicle for clarifying the joint use of components.

FIG. 2 shows a schematic illustration of part of the device 1 in which an arrangement of the units 15 which are respectively composed of an acceleration sensor 9 and an ultrasonic sensor 14 is schematically illustrated for clarifying the joint use of associated components 23. The device 1 comprises here four units 15, each comprising an acceleration sensor 9 and an ultrasonic sensor 14 which are installed on a front bumper 51 of a transportation vehicle 50. The acceleration sensor 9 and the ultrasonic sensor 14 are installed in a joint housing 17. The housing 17 is, for example, a standard housing in which commercially available ultrasonic sensors are installed. Existing infrastructure of the transportation vehicle 50, that is to say associated components 23 such as housings 17, mounts 22, interfaces 18 or control lines 16 which are already present can continue to be used jointly. In this way, there can be a saving in terms of expenditure and material costs.

LIST of REFERENCE NUMBERS

1 Device
2 Sensor system
3 further sensor system
4 Controller
5 Actuator system
6 further actuator system
7 Memory
8 Obstacle detection apparatus
9 Acceleration sensor
10 Safety apparatus
11 Monitoring apparatus
12 Safety criterion
13 Monitoring criterion
14 Ultrasonic sensor
15 Unit
16 Control line
17 Housing
18 Interface
21 Additional systems
22 Mount
23 Component
50 Transportation vehicle
51 Bumper

The invention claimed is:

1. A device for the automated driving of a vehicle, the device comprising:
   at least one sensor system for sensing a surrounding area of the transportation vehicle;
   at least one controller for controlling at least one actuator system of the transportation vehicle; and
   a memory for storing a map of the surroundings;
   at least one further sensor system including at least one ultrasonic sensor, wherein in each of the at least one acceleration sensors and each of the at least one ultrasonic sensors are combined to form a unit, with the result that at least one associated component is used jointly;
   wherein the at least one controller evaluates surroundings data collected by the at least one sensor system to determine the location of the transportation vehicle by the evaluated surroundings data in the map of the surroundings, and controls the at least one actuator system of the transportation vehicle so a predefined trajectory is autonomously travelled,
   wherein the controller comprises an obstacle detection apparatus which detects obstacles in the surroundings of the transportation vehicle,
   wherein the at least one sensor system has at least one acceleration sensor, and the obstacle detection apparatus uses the measurement data acquired by the at least one acceleration sensor to detect collisions with obstacles, and wherein the obstacle detection apparatus classifies obstacles by comparing measurement data acquired by the at least one acceleration sensor with measurement data acquired by the at least one ultrasonic sensor.

2. The device of claim 1, wherein the at least one acceleration sensor is arranged or installed on or in a bumper of the transportation vehicle.

3. The device of claim 1, wherein the at least one jointly used associated component is a mount.

4. The device of claim 1, wherein the at least one jointly used associated component is a control line.

5. The device of claim 1, wherein the at least one acceleration sensor is a multi-dimensional acceleration sensor.

6. The device of claim 1, wherein the controller comprises a safety apparatus which outputs a signal in response to a safety criterion being satisfied by the measurement data acquired by the at least one acceleration sensor.

7. The device of claim 1, wherein the controller comprises a monitoring apparatus for outputting a signal in the parked state of the transportation vehicle in response to satisfaction of a monitoring criterion by the measurement data acquired by the at least one acceleration sensor.

8. A method for the automated driving of a transportation vehicle, the method comprising:

sensing a surrounding area of the transportation vehicle by at least one sensor system;

determining the location of the transportation vehicle in a map of the surroundings by evaluating surroundings data generated based on the sensed surroundings; and autonomously driving along a predefined trajectory by controlling at least one actuator system of the transportation vehicle, wherein an obstacle detection apparatus detects obstacles in the surroundings of the transportation vehicle, wherein the obstacle detection apparatus senses collisions with obstacles using at least one acceleration sensor and at least ultrasonic sensor combined to form a unit to jointly use at least one associated component, and wherein the obstacle detection apparatus classifies obstacles by comparing measurement data acquired by the at least one acceleration sensor with measurement data acquired by the at least one ultrasonic sensor.

* * * * *